United States Patent
Liu et al.

(10) Patent No.: US 9,576,598 B1
(45) Date of Patent: Feb. 21, 2017

(54) MAGNETIC RECORDING WRITE APPARATUS HAVING A POLE AND A MAGNETIC SEPARATION LAYER

(71) Applicant: Western Digital (Fremont), LLC, Fremont, CA (US)

(72) Inventors: Feng Liu, San Ramon, CA (US); Zhanjie Li, Pleasanton, CA (US); Peng Luo, San Ramon, CA (US); Zhigang Bai, Fremont, CA (US)

(73) Assignee: WESTERN DIGITAL (FREMONT), LLC, Fremont, CA (US)

( * ) Notice: Subject to any disclaimer, the term of this patent is extended or adjusted under 35 U.S.C. 154(b) by 0 days.

(21) Appl. No.: 15/199,793

(22) Filed: Jun. 30, 2016

(51) Int. Cl.
G11B 5/127 (2006.01)
G11B 5/31 (2006.01)

(52) U.S. Cl.
CPC .............. *G11B 5/313* (2013.01); *G11B 5/127* (2013.01)

(58) Field of Classification Search
CPC ............ G11B 5/127; G11B 5/187; G11B 5/31
USPC ....................... 360/125.02–125.06, 125.1–125.7,360/125.12, 125.21, 125.22
See application file for complete search history.

(56) References Cited

U.S. PATENT DOCUMENTS

| | | | |
|---|---|---|---|
| 6,906,894 B2 | 6/2005 | Chen et al. | |
| 6,984,333 B2 | 1/2006 | Matono et al. | |
| 7,180,705 B2 | 2/2007 | Matono et al. | |
| 7,395,595 B2 | 7/2008 | Lee et al. | |
| 7,426,092 B2 | 9/2008 | Fukui et al. | |
| 7,457,080 B2 | 11/2008 | Watabe et al. | |
| 7,483,243 B2 | 1/2009 | Fukui et al. | |
| 7,518,826 B2 | 4/2009 | Matono et al. | |
| 7,522,376 B2 | 4/2009 | Matono et al. | |
| 7,646,564 B2 | 1/2010 | Maruyama et al. | |
| 7,848,053 B2 | 12/2010 | Mochizuki et al. | |
| 7,889,456 B2 | 2/2011 | Jiang et al. | |
| 8,085,498 B2 | 12/2011 | Bai et al. | |
| 8,259,411 B2 | 9/2012 | Yang et al. | |
| 8,264,792 B2 | 9/2012 | Bai et al. | |
| 8,339,738 B1 | 12/2012 | Tran et al. | |
| 8,379,347 B2 | 2/2013 | Guan et al. | |
| 8,405,930 B1 | 3/2013 | Li et al. | |
| 8,498,079 B1 | 7/2013 | Song et al. | |
| 8,537,494 B1 | 9/2013 | Pan et al. | |
| 8,576,514 B2 | 11/2013 | Sasaki et al. | |
| 8,582,234 B2 | 11/2013 | Linville et al. | |
| 8,804,281 B1 | 8/2014 | Tang et al. | |

(Continued)

OTHER PUBLICATIONS

Feng Liu, et al., U.S. Appl. No. 15/097,182, filed Apr. 12, 2016, 31 pages.

(Continued)

*Primary Examiner* — Allen T Cao
(74) *Attorney, Agent, or Firm* — Convergent Law Group LLP (57) ABSTRACT

A magnetic write apparatus has a media-facing surface (MFS) and includes a main pole, an auxiliary pole, a magnetic separation layer and coil(s). The auxiliary pole is adjacent to the main pole and has an auxiliary pole front surface recessed from the MFS by a first distance. The first distance is nonzero. The magnetic separation layer has a front surface facing the MFS and a back surface opposite to the front surface. The back surface is closer to the MFS than the first distance. The front surface is recessed from the MFS by a second distance that is nonzero. The coil(s) energize the main pole.

20 Claims, 4 Drawing Sheets

(56) References Cited

U.S. PATENT DOCUMENTS

| | | |
|---|---|---|
| 8,848,315 B2 | 9/2014 | Yang et al. |
| 8,917,480 B2 | 12/2014 | Liu et al. |
| 8,929,029 B2 | 1/2015 | Min et al. |
| 9,053,715 B1 | 6/2015 | Wang et al. |
| 9,111,550 B1 | 8/2015 | Liu et al. |
| 2003/0128633 A1 | 7/2003 | Batra et al. |
| 2003/0193742 A1* | 10/2003 | Matono ................ G11B 5/3116 360/125.06 |
| 2009/0236307 A1* | 9/2009 | Okada ................ G11B 5/1278 216/22 |
| 2012/0257305 A1 | 10/2012 | Tang et al. |

OTHER PUBLICATIONS

Peng Luo et al., U.S. Appl. No. 15/081,727, filed Mar. 25, 2016, 25 pages.

* cited by examiner

MAGNETIC RECORDING WRITE APPARATUS HAVING A POLE AND A MAGNETIC SEPARATION LAYER

BACKGROUND

A magnetic recording apparatus, such as a disk drive, typically includes a write apparatus and a read apparatus. The write apparatus includes a main pole used to write to a media, a nonmagnetic gap layer, side shield(s), a leading shield, a trailing shield, auxiliary poles recessed from the air-bearing surface (ABS) and coils for energizing the pole. Although such a magnetic recording apparatus functions, there is a continued desire to push magnetic recording to higher areal densities. For higher areal densities, higher data rates are also desired. A high data rate requires a reduced field rise time while maintaining a sufficient field magnitude. Sufficiently small wide area track erasure (WATer) is also desired in order to prevent inadvertent writing to nearby tracks. Current magnetic recording apparatuses may be unable to meet these specifications.

DETAILED DESCRIPTION OF THE PREFERRED EMBODIMENTS

While the various embodiments disclosed are applicable to a variety of data storage devices such as magnetic recording disk drives, solid-state hybrid disk drives, networked storage systems etc., for the sake of illustration the description below uses disk drives as examples.

Figure 1A:
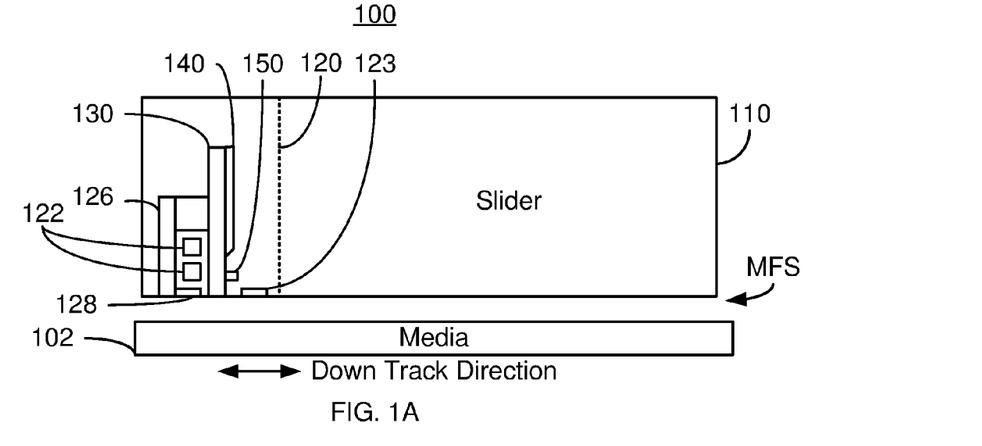
FIGS. 1A and 1B depict side and close-up apex views of an exemplary embodiment of a magnetic recording data storage device.
Figure 1B:
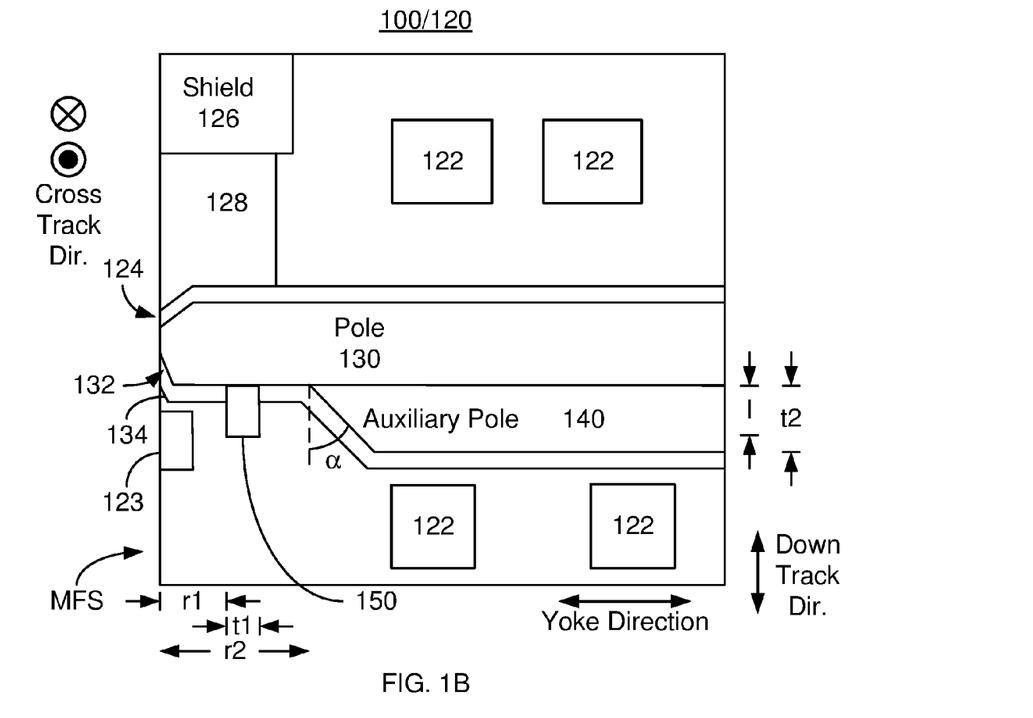

FIGS. 1A and 1B depict side and close-up apex views of an exemplary embodiment of a portion of a data storage device 100 including a write apparatus 120. For clarity, FIGS. 1A and 2B are not to scale. For simplicity not all portions of the data storage device 100 and write apparatus 120 are shown. In addition, although the data storage device 100 and write apparatus 120 are depicted in the context of particular components other and/or different components may be used. For example, circuitry used to drive and control various portions of the data storage device 100 is not shown. For simplicity, only single components are shown. However, multiples of each components and/or and their sub- components, might be used. The data storage device 100 may be a perpendicular magnetic recording (PMR) disk drive. However, in other embodiments, the data storage device 100 may be configured for other types of magnetic recording.

The data storage device 100 includes media 102, a slider 110, a write apparatus 120 and a media-facing surface (MFS). The MFS is proximate to the media 102 during use. The write apparatus 120 is fabricated on the slider 110 and includes the MFS. In the embodiment shown, the data storage device 100 is a disk drive. Consequently, the MFS is an air-bearing surface (ABS). In some embodiments, the MFS is a different gas-bearing surface, .e.g. helium. Although not shown, the slider 110 and thus the write apparatus 120 are generally attached to a suspension. In general, the data storage device 100 includes a write apparatus 120 and a read apparatus (not shown). However, for clarity, only the write apparatus 120 is shown.

The write apparatus 120 includes coils 122, write gap 124, main pole 130, auxiliary pole 140 and magnetic separation layer 150. The apparatus may also include a leading shield 123, trailing shield 126 with pedestal 128, back gap (not shown), a side/bottom gap 134 and side shields (not shown). Multiple structures on which the leading shield 123 and other components are fabricated may reside below the components shown. As discussed above, portions of the components 122, 123, 124, 126, 128, 130, 134, 140 and 150 may include multiple layers. In other embodiments, different and/or additional components may be used in the write apparatus 120.

The coil(s) 122 are used to energize the main pole 130. Two turns 122 are depicted in FIGS. 1A and 1B. Another number of turns may, however, be used. For example, a single turn may be used. Note that only a portion of the coil(s) 122 is shown in FIG. 1A. Additional turns and/or additional layers of coils may be used. The coil(s) 122 are shown in FIG. 1B as forming a helical coil around the main pole 130 and auxiliary pole 140. In other embodiments, the coil(s) 122 may form a spiral, or pancake, coil. In such embodiments, additional portions of the coil(s) 122 may be located further from MFS instead of on the leading side of the main pole 130. In addition, other coil(s) and/or another number of layers may be present.

The main pole 130 is ferromagnetic and may have a high saturation magnetization in excess of 2.0 T. For example, the main pole 130 may utilize material(s) having a saturation magnetization of 2.4 T or more. The main pole 130 includes a pole tip 132 close to the MFS and a yoke recessed from the MFS. The pole tip 132 may occupy a portion of the MFS. In some embodiments, the pole tip 132 has a thickness of at least two hundred nanometers and not more than three hundred nanometers in the down track direction. The pole tip region 132 also includes sidewalls in the cross track direction. The sidewalls are generally configured such that the pole 130 has a bottom and a top wider than the bottom. In addition, the sidewalls are oriented at a flare angle from a surface parallel to the MFS. The flare angle is greater than zero and less than ninety degrees. The pole tip region 132 is shown as having bottom/leading surface close to the leading shield 123 and a top/trailing surface close to the trailing shield pedestal 128. As can be seen in FIG. 1B, both the leading surface and the trailing surface are beveled. In other embodiments, one or both of the leading surface and trailing surface may not be beveled, instead extending in a direction substantially perpendicular to the MFS.

The side gap 134 and bottom gap may be deposited as a single layer. The side gap 134 may thus be referred as the side gap, the bottom gap or the side/bottom gap. The thicknesses of and material(s) used for the side/bottom gap 134 may be the same and are generally nonmagnetic insulators. The side/bottom gap 134 in the embodiment shown may be at least twenty nanometers thick and not more than sixty nanometers thick. For example, for shingle magnetic recording the side gap 134 thickness may be on the order of twenty-five nanometers. For perpendicular magnetic recording, the side gap 134 thickness maybe nominally fifty nanometers. In general, the side/bottom gap 134 is desired to be not more than one-half of the thickness of the auxiliary pole 140. In some embodiments, the side gap 134 is not more than one-third of the auxiliary pole 140 thickness.

The auxiliary pole 140 is adjacent to the main pole 130 and on the leading surface side of the main pole 130. In other embodiments, the auxiliary pole 140 may be on the trailing surface of the main pole 130 or be omitted. An additional auxiliary pole (not shown in FIGS. 1A and 1B) may also be present on and adjacent to the trailing surface of the main pole 130. In the embodiment shown, the auxiliary pole 140 adjoins, or shares an interface with, the main pole 130. The footprint of the auxiliary pole 140 may be the same as or different from that of the main pole 130. Stated differently, shape of the auxiliary pole 140 may or may not match that of yoke of the main pole 130. The outer edges of the auxiliary pole 140 in the cross-track and yoke direction may be recessed from the outer edges of the main pole 130. In other embodiments, the outer edges of the auxiliary pole 140 and main pole 130 may be aligned.

The auxiliary pole 140 is recessed from the MFS by a distance r2. For example, the auxiliary pole 140 may be recessed at least 0.45 micrometer and not more than 1.2 micrometer from the MFS. In some cases, r2 is at least 0.5 micrometer and not more than 0.8 micrometer. The auxiliary pole 140 may also be relatively thin. The auxiliary pole 140 may have a thickness, t2 of at least 0.2 micrometer and not more than 0.4 micrometer in the down track direction. For example, t2 may be at least two hundred and forty nanometers and not more than three hundred and thirty nanometers. As can be seen in FIG. 1B, the sides of the auxiliary pole 140 may be at a nonzero angle, α, from a down track direction. This angle may be at least fifteen degrees and not more than seventy-five degrees. In some embodiments, this angle is at least twenty-five degrees and not more than sixty degrees. In some cases, the front (MFS facing), side and/or back surface(s) of the auxiliary pole 140 form this angle. In other embodiments, the one or more of the front, side and back surfaces of the auxiliary pole 140 may be parallel to the MFS. The auxiliary pole 140 is magnetic and may have a high saturation magnetization. The auxiliary pole 140 may have a saturation magnetization of at least 2.0 T. In some embodiments, the saturation magnetization of the auxiliary pole 140 may be at least 2.2 T. In some such cases, the saturation magnetization of the auxiliary pole 140 may be at least 2.4 T.

The magnetic separation layer 150 is also present. The magnetic separation layer 150 has a front surface facing the MFS and a back surface opposite to the front surface. The thickness, t1, of the magnetic separation layer 150 is the distance between the front and back surfaces. In some embodiments, the thickness t1 is at least 0.1 micrometer and not more than 0.6 micrometer. For example, t1 may be a least 0.2 micrometer and not more than 0.3 micrometer. The back surface of the magnetic separation layer 150 is closer to the MFS than the auxiliary pole 140. The front surface of the magnetic separation layer 150 is recessed from the MFS by a distance, r1, that is nonzero. This distance r1 may be least 0.15 micrometer and not more than 0.75 micrometer. For example, the recess distance r1 may be at least 0.3 micrometer and not more than 0.4 micrometer. The magnetic separation layer 150 also has a length, l, parallel to the MFS. This length may be at least two hundred nanometers and not more than six hundred nanometers. In some embodiments, the length l is at least two hundred forty nanometers and not more than three hundred thirty nanometers. In some embodiments, l is less than t2 (magnetic separation layer 150 is thinner than the auxiliary pole 140). In other embodiments, l is greater than t2. In still other embodiments, l may be the same as t2.

The magnetic separation layer 150 is magnetic. In some embodiments, the magnetic separation layer has a saturation magnetization of at least 2.2 T. In some such embodiments, the magnetic separation layer 150 has a saturation magnetization of at least 2.4 T. Thus, the magnetic separation layer 150 may be formed of the same material as the main pole 130 or of a different material than the main pole 130. In the embodiment shown in FIGS. 1A and 1B, the magnetic separation layer 150 adjoins, or shares an interface with, the main pole 130. In such cases, it may be desirable that the length, l, of the magnetic separation layer 150 is at least one-half multiplied by the thickness, t2, of the auxiliary pole 140. In other embodiments, the magnetic separation layer 150 may be spaced apart from the main pole 130 in the down track direction. In such embodiments, it may be desirable for the magnetic separation layer 150 to have a higher length, closer to or at the upper limit of range described above. Further, the smaller the recess distance, r1, of the magnetic separation layer 150, the lower the desired length, l, of the magnetic separation layer 150 may be. The magnetic separation layer 150 may be as wide as the pole 130 at the location of the magnetic separation layer 150. In other embodiments, the magnetic separation layer 150 may have a different width, including wider than the main pole 130. In the embodiment shown in FIGS. 1A and 1B, the magnetic separation layer 150 has a leading (bottom) surface that is substantially perpendicular to the MFS. In other embodiments, the leading surface might be beveled in a manner similar to the leading bevel of the main pole 130.

The magnetic data storage device 100 may exhibit improved performance. The magnetic separation layer 150 in conjunction with the auxiliary pole 140 may allow for improved wide area track erasure (WATEr). Further, the configuration of the write apparatus 100 may allow for reduced rise time and improved saturation performance while maintaining a sufficient write field for higher areal density recording. Thus, performance of the data storage device 100 and write apparatus 120 may be improved.

Figure 2:
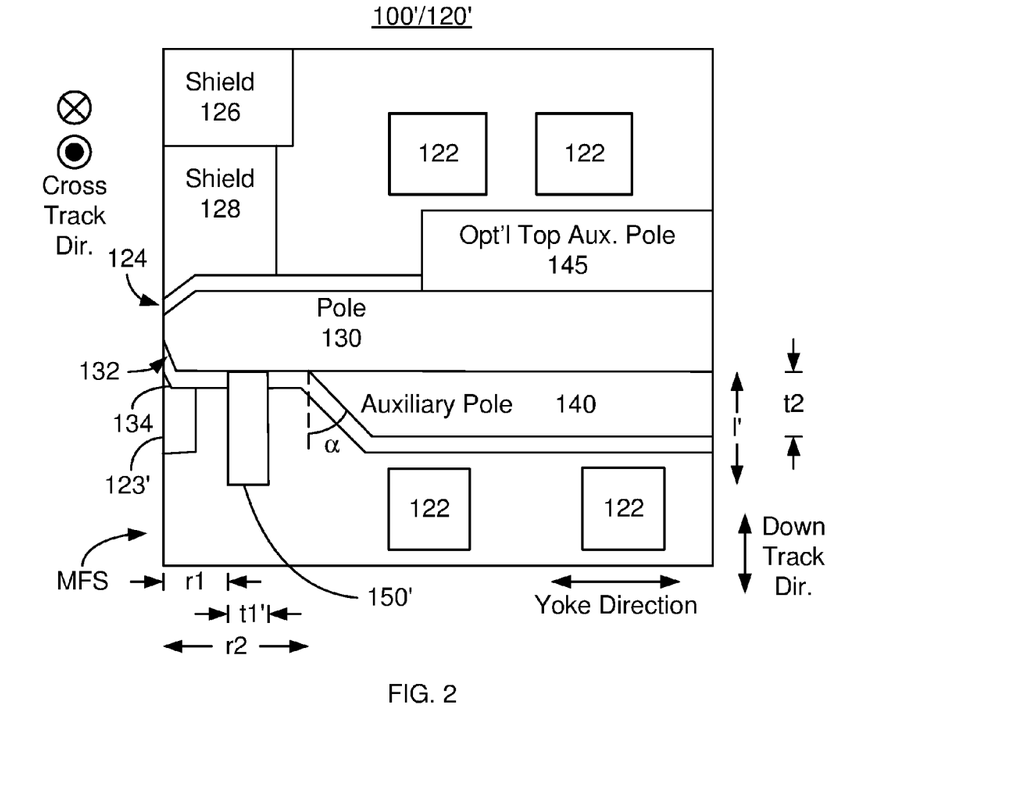
FIG. 2 depicts a close-up apex views of another exemplary embodiment of a magnetic recording data storage device.

FIG. 2 depicts an apex view of another exemplary embodiment of a magnetic recording apparatus 120' that may be used in a data storage device 100'. For clarity, FIG. 2 is not to scale. For simplicity not all portions of the write apparatus 120' are shown. The data storage device 100' may but need not be a disk drive. The magnetic write apparatus 120' and data storage device 100' are analogous to the write apparatus 120 and data storage device 100, respectively. Thus, analogous components have similar labels. Thus, the write apparatus 120' includes coils 122, write gap 124, optional leading shield 123', optional trailing shield 126 having pedestal 128, a back gap (not shown), main pole 130, auxiliary pole 140 and magnetic separation layer 150' that are analogous to the coils 122, write gap 124, leading shield 123, optional trailing shield 126 having pedestal 128, back gap (not shown), main pole 130, auxiliary pole 140 and magnetic separation layer 150, respectively. The trailing surface of the leading shield 123' may better match the leading surface of the main pole 130. Thus, the trailing surface of the leading shield 123' may be beveled. The dimensions and recess distance of the auxiliary pole 140 are generally desired to be within the boundaries described above.

The magnetic write apparatus 120' also includes an additional auxiliary pole 145. The additional auxiliary pole 145 may be recessed from the MFS by less than four microns. In some embodiments, the surface of the auxiliary pole 145 closest to the MFS may be nominally at least one and not more than three microns from the MFS. In other embodiments, the additional auxiliary pole 145 may be recessed another distance or be omitted.

The magnetic separation layer 150' has a different length l' and a different thickness t1'. The magnetic separation layer 150' has a length l' that is greater than the thickness t2 of the auxiliary pole 140. The thickness of the magnetic separation layer 150' has also been increased. However, the dimensions and recess distance of the magnetic separation layer 150' are generally desired to be within the boundaries described above.

The magnetic recording apparatus 120' shares the benefits of the data storage device 100 and magnetic recording apparatus 120. The short yoke length and configuration of the main pole 130 in conjunction with the auxiliary poles 140 and 145 may allow for reduced rise time and improved saturation performance while maintaining a sufficient write field. In addition, the write apparatus 120' may still have acceptable WATEr due at least in part to the magnetic separation layer 150'. Thus, performance of the disk drive 100' and write apparatus 120' may be improved.

Figure 3:
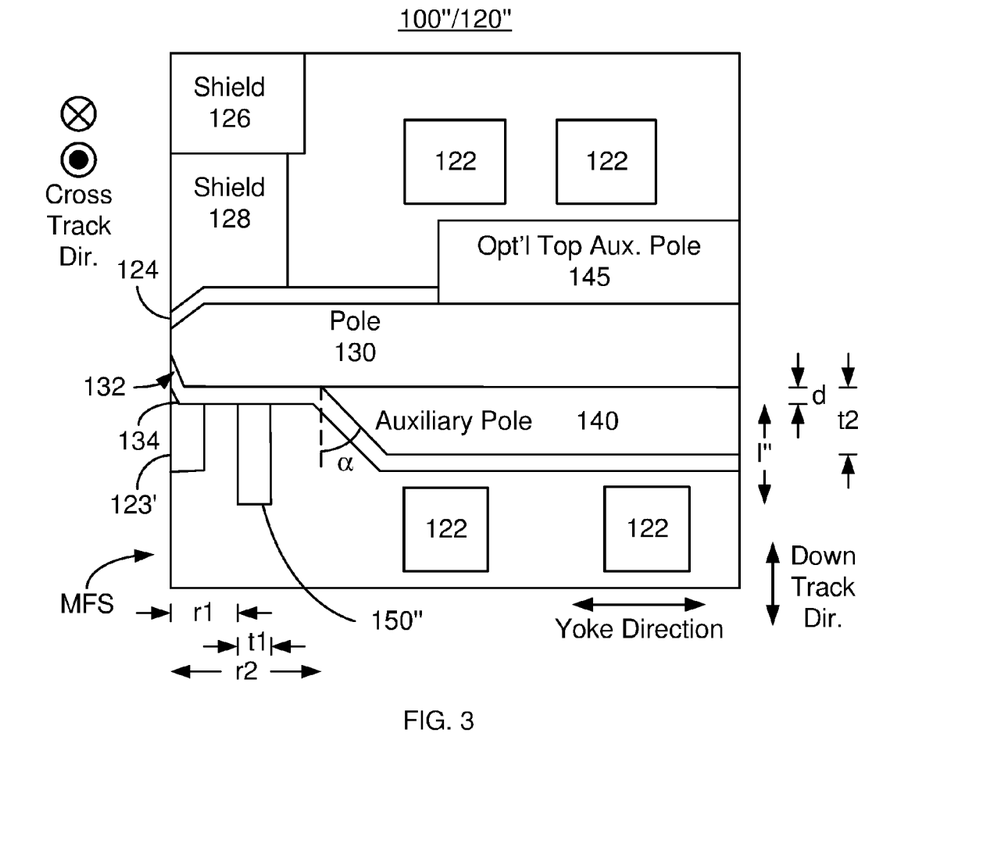
FIG. 3 depicts a close-up apex views of another exemplary embodiment of a magnetic recording data storage device.

FIG. 3 depicts an apex view of another exemplary embodiment of a magnetic recording apparatus 120" that may be used in a data storage device 100". For clarity, FIG. 3 is not to scale. For simplicity not all portions of the write apparatus 120" are shown. The data storage device 100" may but need not be a disk drive. The magnetic write apparatus 120" and data storage device 100" are analogous to the write apparatus 120/120' and data storage device 100/100', respectively. Thus, analogous components have similar labels. Thus, the write apparatus 120" includes coils 122, write gap 124, optional leading shield 123', optional trailing shield 126 having pedestal 128, a back gap (not shown), main pole 130, auxiliary pole 140, optional top auxiliary pole 145 and magnetic separation layer 150" that are analogous to the coils 122, write gap 124, leading shield 123/123', optional trailing shield 126 having pedestal 128, back gap (not shown), main pole 130, auxiliary pole 140, optional top auxiliary pole 145 and magnetic separation layer 150/150', respectively. The dimensions and recess distance of the auxiliary pole 140 is generally desired to be within the boundaries described above.

The magnetic separation layer 150" has a different length l" and a thickness t1. The magnetic separation layer 150" has a length l" that is greater than the thickness t2 of the auxiliary pole 140. However, the dimensions and recess distance of the magnetic separation layer 150" are generally desired to be within the boundaries described above. In addition, the magnetic separation layer 150" is spaced apart from the main pole 130. The distance, d, between the magnetic separation layer 150" and the main pole 130 is the width of the side/bottom gap 134. In other embodiments, the distance may be smaller than the width of the side/bottom gap 134.

The magnetic recording apparatus 120" shares the benefits of the data storage device 100/100' and magnetic recording apparatus 120/120'. The short yoke length and configuration of the main pole 130 in conjunction with the auxiliary poles 140 and 145 may allow for reduced rise time and improved saturation performance while maintaining a sufficient write field. In addition, the write apparatus 120" may still have acceptable WATEr due at least in part to the magnetic separation layer 150". Thus, performance of the disk drive 100" and write apparatus 120" may be improved.

Various features of the magnetic recording apparatuses 120, 120' and 120" have been depicted and described herein. One of ordinary skill in the art will recognize that these features may be combined in other manners not explicitly disclosed herein.

Figure 4:
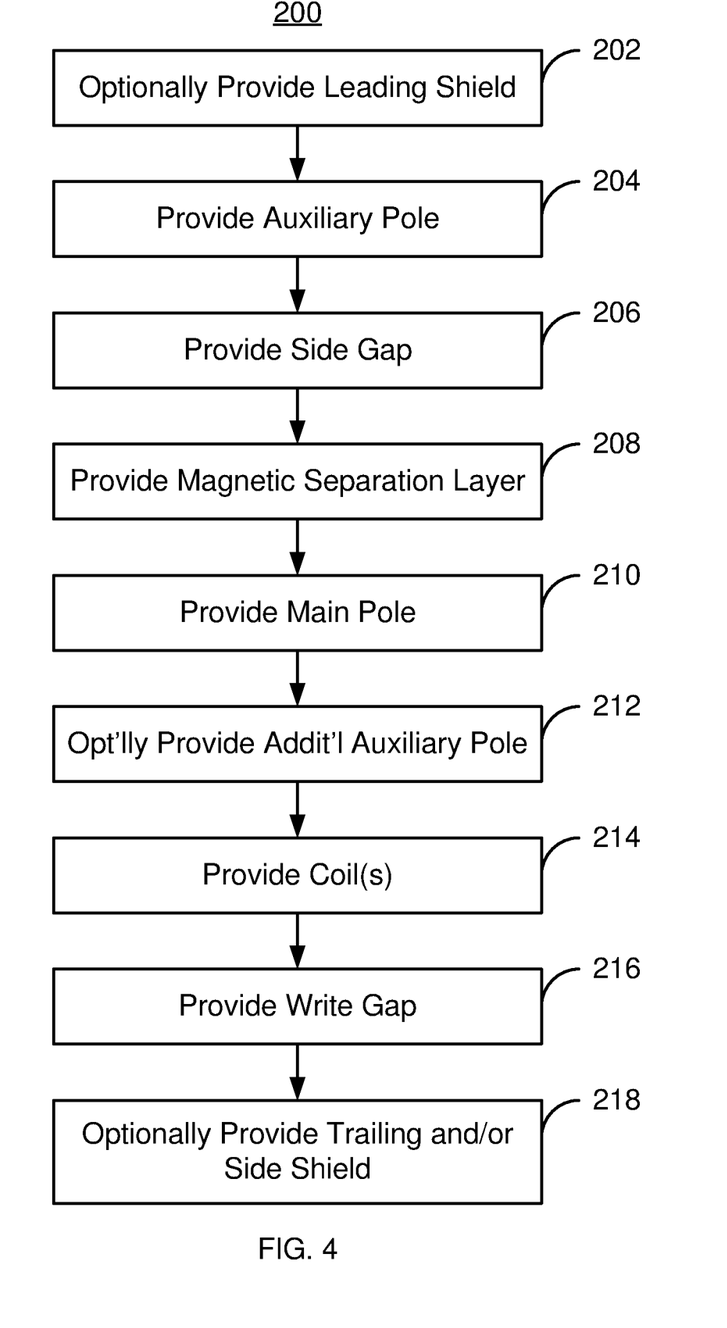
FIG. 4 is a flow chart depicting an exemplary embodiment of a method for providing a magnetic recording apparatus.

FIG. 4 depicts an exemplary embodiment of a method 200 for providing a magnetic recording apparatus 120, 120' and/or 120". For simplicity, some steps may be omitted, interleaved, combined and/or include substeps. The method 200 is also described in the context of providing a data storage device 100 and magnetic recording apparatus 120 depicted in FIGS. 1A-1B. The method 200 may also be used to fabricate other magnetic recording apparatuses including but not limited to any combination of 120' and/or 120". The method 200 may be used to fabricate multiple magnetic recording apparatuses at substantially the same time. The method 200 is also described in the context of particular layers. A particular layer may include multiple materials and/or multiple sub-layers. The method 200 also may start after formation of other portions of the magnetic recording head. For example, the method 200 may start after a read apparatus and/or other structure have been fabricated.

Referring to FIGS. 1A-1B and 4, the leading shield 123 may optionally be provided, via step 202. The auxiliary pole 140 may be provided, via step 204. Step 204 may include using one or more damascene processes. For example, a trench may be formed in a layer. The trench may be fabricated such that portions of the trench have the desired shape and location of the auxiliary pole 140. The width of the trench may have the desired footprint of the auxiliary pole. In addition, the sidewalls of the trench may be angled from parallel to the MFS. A seed layer may optionally be provided. The material(s) for the auxiliary pole 140 are deposited, for example via plating. One or more ferromagnetic materials may be used. Other methods may also be used to form the auxiliary pole 140 including but not limited to full film deposition of the appropriate materials and removal for example via milling. In some embodiments, the magnetic materials for the auxiliary pole 140 may be provided when the materials for the main pole are provided. In some such embodiments, the same magnetic materials are used for the auxiliary pole 140 as for the main pole 130.

The side gap may be provided, via step 206. Step 206 may be performed before or interleaved with step(s) 204 and/or 210. For example, if a damascene process is used for the main pole, then the side gap may be deposited in the trench for the main pole 130 before deposition of ferromagnetic pole material(s).

The magnetic separation layer 150 is provided, via step 208. Step 208 may include forming a trench in a nonmagnetic layer and refilling the trench with the magnetic material(s) for the magnetic separation layer 150. This trench may be formed after/in addition to the pole trench for the main pole 130. If the magnetic separation layer 150 is formed of the same material(s) as the main pole 130, then the material(s) for the magnetic separation layer 150 may be provided in same step as the material(s) for the main pole 130.

The main pole 130 is provided, via step 210. In some embodiments, a damascene process may be used for step 210. For example, a trench may be formed in a layer. The trench may be fabricated such that portions of the trench have the desired shape and location of the main pole 130. An additional trench for step 208 that has the size and location of the magnetic separation layer 150 may also be formed as part of this process. The trench may also be configured so that the beveled leading surface of the pole tip 132 is naturally formed as the trench is filled. The material(s) for the pole 130 are deposited, for example via plating. One or more ferromagnetic materials may be used. In some embodiments, ferromagnetic material(s) are used for the main pole 130, magnetic separation layer 150 and the auxiliary pole 140. In other embodiments, some ferromagnetic material(s) may be used for the main pole 130, but different ferromagnetic material(s) used for the auxiliary pole 140 and/or magnetic separation layer 150. Other methods may also be used to form the pole 130 including but not limited to full film deposition of the appropriate materials and removal for example via milling.

An additional auxiliary pole may optionally be provided, via step 212. Such an auxiliary pole 145 is depicted in FIGS. 2 and 3. The coil(s) 122 are also provided, via step 214. Portions of step 214 may thus be interleaved with the remaining steps of the method 200. For example, portions of the coils 122 may be provided before the formation of the main pole 130 and/or auxiliary pole 140. However, other portions of the coil 122 may be provided after some or all of the main pole 130 has been formed. Step 214 may also include depositing and patterning the material(s) used for the coil(s) 122. Step 214 may include forming one or more helical coils or one or more pancake/spiral coil. In such embodiments, a spiral coil may include other turns far from the MFS.

The write gap 124 may be provided, via step 216. Step 216 includes depositing a nonmagnetic material. One or more layers may be deposited in step 214. The material may be conformally deposited. In addition, portions of the write gap may be removed to provide a write gap that has varying thicknesses.

The trailing shield 126 and/or side shields (not shown) may be provided, via step 218. As part of step 218, the pedestal 128 may also be fabricated. Formation of the side shields may include removing material(s) in the location of the side shields, providing a mask and depositing the side shield material(s). In some embodiments, the side shield material(s) may be plated.

Using the method 200, the data storage device 100, 100' and/or 100" and magnetic apparatuses 120, 120' and/or 120" may be provided. Thus, the benefits of the magnetic apparatuses 120, 120' and/or 120" may be achieved.

What is claimed is:

1. A magnetic write apparatus having a media-facing surface (MFS) comprising:
    a main pole;
    an auxiliary pole adjacent to the main pole and having an auxiliary pole front surface recessed from the MFS by a first distance, the first distance being nonzero;
    a magnetic separation layer having a front surface facing the MFS and a back surface opposite to the front surface, the back surface being closer to the MFS than the first distance, the front surface being recessed from the MFS by a second distance, the second distance being nonzero; and
    at least one coil for energizing the main pole.

2. The magnetic write apparatus of claim 1 wherein the magnetic separation layer has a saturation magnetization of at least 2.2 T.

3. The magnetic write apparatus of claim 1 wherein the magnetic separation layer has a thickness between the front surface and the back surface of at least 0.1 micron and not more than 0.6 micron.

4. The magnetic write apparatus of claim 1 wherein the magnetic separation layer has a length parallel to the MFS of at least two hundred nanometers and not more than six hundred nanometers.

5. The magnetic write apparatus of claim 1 wherein the second distance is at least 0.15 micron and not more than 0.75 micron.

6. The magnetic write apparatus of claim 1 wherein the magnetic separation layer has a top surface having a location, the location being selected from adjoining the main pole and separated from the main pole by at least a side gap thickness.

7. The magnetic write apparatus of claim 6 wherein the magnetic separation layer has a length parallel to the MFS of at least two hundred forty nanometers and not more than three hundred thirty nanometers, wherein the second distance is at least 0.3 micron and not more than 0.4 micron, and wherein the magnetic separation layer has a thickness between the front surface and the back surface of at least 0.2 micron and not more than 0.3 micron.

8. The magnetic write apparatus of claim 1 wherein the auxiliary pole is recessed by at least 0.45 micron and not more than 1.2 micron from the MFS.

9. The magnetic write apparatus of claim 8 wherein the auxiliary pole has a thickness in a down track direction perpendicular to a cross-track direction of at least 0.2 micron and not more than 0.4 micron.

10. The magnetic write apparatus of claim 1 wherein the auxiliary pole has at least one side with at least one angle from a down track direction perpendicular to a cross-track direction, the at least one angle being at least twenty-five degrees and not more than sixty degrees.

11. The magnetic write apparatus of claim 1 wherein the auxiliary pole includes at least one magnetic material having a saturation magnetization of at least 2.2 T.

12. A data storage device comprising:
    a media; and
    a magnetic write apparatus having a media-facing surface (MFS), the magnetic write apparatus including a main pole, an auxiliary pole, a magnetic separation layer and at least one coil for energizing the main pole, the auxiliary pole being adjacent to the main pole and having an auxiliary pole front surface recessed from the MFS by a first distance, the first distance being nonzero, the magnetic separation layer having a front surface facing the MFS and a back surface opposite to the front surface, the back surface being closer to the MFS than the first distance, the front surface being recessed from the MFS by a second distance, the second distance being nonzero.

13. A method for providing a magnetic write apparatus having a media-facing surface (MFS) comprising:
    providing a main pole;
    providing an auxiliary pole adjacent to the main pole and having an auxiliary pole front surface recessed from the MFS by a first distance, the first distance being nonzero;
    providing a magnetic separation layer having a front surface facing the MFS and a back surface opposite to the front surface, the back surface being closer to the MFS than the first distance, the front surface being recessed from the MFS by a second distance, the second distance being nonzero; and
    providing at least one coil for energizing the main pole.

14. The method of claim 13 wherein the magnetic separation layer has a thickness between the front surface and the back surface of at least 0.1 micron and not more than 0.6 micron.

15. The method of claim 13 wherein the magnetic separation layer has a length parallel to the MFS of at least two hundred nanometers and not more than six hundred nanometers.

16. The method of claim 13 wherein the second distance is at least 0.15 micron and not more than 0.75 micron.

17. The method of claim 13 wherein the magnetic separation layer has a top surface having a location, the location being selected from adjoining the main pole and separated from the main pole by at least a side gap thickness.

18. The method of claim 17 wherein the magnetic separation layer has a length parallel to the MFS of at least two hundred forty nanometers and not more than three hundred thirty nanometers, wherein the second distance is at least 0.3 micron and not more than 0.4 micron, and wherein the magnetic separation layer has a thickness between the front surface and the back surface of at least 0.2 micron and not more than 0.3 micron.

19. The method of claim 13 wherein the auxiliary pole is recessed by at least 0.45 micron and not more than 1.2 micron from the MFS and has a thickness in a down track direction perpendicular to a cross-track direction of at least 0.2 micron and not more than 0.4 micron.

20. The method of claim 13 wherein the auxiliary pole has at least one side with at least one angle from a down track direction perpendicular to a cross-track direction, the at least one angle being at least twenty-five degrees and not more than sixty degrees.

* * * * *